(12) United States Patent
Freeny, Jr.

(10) Patent No.: US 6,477,242 B1
(45) Date of Patent: Nov. 5, 2002

(54) ELECTRONIC TELEPHONE CLIENT SERVICE PROVIDER SYSTEM (EP/CSP)

(75) Inventor: Charles C. Freeny, Jr., Grand Praire, TX (US)

(73) Assignee: Automated Business Companies

(*) Notice: Subject to any disclaimer, the term of this patent is extended or adjusted under 35 U.S.C. 154(b) by 0 days.

(21) Appl. No.: 09/510,028

(22) Filed: Feb. 22, 2000

Related U.S. Application Data

(60) Provisional application No. 60/121,193, filed on Feb. 23, 1999.

(51) Int. Cl.[7] .............................................. H04M 11/00
(52) U.S. Cl. ............................... 379/93.24; 379/90.01; 379/93.05; 370/352
(58) Field of Search .......................... 379/90.01, 93.05, 379/93.09, 93.24; 370/352, 353, 354, 355, 356; 358/440, 438; 455/461

(56) References Cited

U.S. PATENT DOCUMENTS

| | | |
|---|---|---|
| 5,727,058 A | 3/1998 | Blumhardt et al. |
| 5,742,905 A | 4/1998 | Pepe et al. .................. 455/461 |
| 6,169,734 B1 * | 1/2001 | Wilson ........................ 370/352 |
| 6,240,085 B1 * | 5/2001 | Iwami et al. ................ 370/352 |

FOREIGN PATENT DOCUMENTS

| | | |
|---|---|---|
| EP | 0526764 | 10/1993 |
| EP | 0881812 | 2/1998 |
| WO | 9107838 | 5/1991 |
| WO | 9307566 | 4/1993 |
| WO | 9320641 | 10/1993 |
| WO | 9742776 | 11/1997 |
| WO | WO 98/05145 | 2/1998 |

* cited by examiner

*Primary Examiner*—Melur Ramakrishnaiah
(74) *Attorney, Agent, or Firm*—Dunlap, Codding & Rogers

(57) ABSTRACT

An alpha-numeric string electronic telephone and client service provider communication system is superimposed over the existing Internet, telephone and pager legacy systems to provide a much simpler communication system that will work seamlessly with the existing communication systems. The new system will allow an unlimited number of connections and unlimited number of signal type protocols to be used in the future and eventually phase out all of the separate numeric only telephone systems world wide and at the same time integrate the legacy e-mail system of the Internet with the legacy world wide numeric communication systems in a seamless and more powerful manner.

16 Claims, 4 Drawing Sheets

ELECTRONIC TELEPHONE CLIENT SERVICE PROVIDER SYSTEM (EP/CSP)

CROSS-REFERENCE TO RELATED APPLICATIONS

This application claims priority to the provisional patent application identified by U.S. Ser. No. 60/121,193, entitled "Electronic Telephone Service Provider System", which was filed on Feb. 23, 1999.

BACKGROUND

The Internet has rapidly changed the way people are starting to communicate and the Internet Service Provider has given rise to a rapidly growing service industry. The legacy post office mail and telephone system communication methods are rapidly being replaced by e-mail communication. The reason is simple; e-mail is both more convenient and less expensive than legacy mail and/or long distance charges. This is especially true for other country mail delivery or legacy telephone service. Before long, the facsimile machine will hardly be recognizable in its present form (see co-pending MIMS invention Serial No. 60/114, 594). Even new telephones, and software operated on ISP platforms designed to use the Internet to reduce long distance charges are becoming more user friendly even though they are far from practical. However all of these new Internet communication systems still keep the e-mail address separate from the telephone numbers created by the legacy telephone companies. That is, many business cards now have to carry the telephone number, facsimile number, and e-mail address, pager number and even a 1-800 number to provide basic communication information to the recipient. At the same time, the communication bandwidth infrastructure such as, fiber optics cables, low orbit satellites, digital cellular telephones, and DSP is allowing the legacy telephone numbering system to grow at a rate it never anticipated. Some cities such as Dallas, Los Angeles, Atlanta, etc., have had to add new area codes over old area codes causing many customers to have different area codes at the same location. It is predicted that this situation will only get worse as more and more machines require their own telephone connection. In short, a more modern communication system is needed that has unlimited growth and is consistent with the new Internet Protocol systems. This invention describes such a system and will allow communication connection information in the future to use alpha-numeric strings which are easily understood by everybody all over the world and relate to all of the connection devices that an individual or business needs.

SUMMARY OF THE INVENTION

The new telephone system described herein uses and combines the basic infrastructure and methods of existing legacy telephone systems, pager systems, and e-mail systems. The new system refers to one key subsystem element as an E-phone (EP) to distinguish it from the legacy telephones and the other key subsystem element as a Client Service Provider Unit (CSPU) to distinguish it from the existing legacy telephone service systems. The CSP system can use both regular telephone and pager numbers to connect to another person or machine and it can use e-mail addresses to connect to another person or machine. However each EP has at least one e-mail address associated with it that has been verified as unique by an Internet Service Provider (ISP). The ISP could also be your local telephone company. Any person can then contact you using your e-mail address from their EP, computer, or web television and/or for many years in the future contact you using your old legacy telephone or pager numbers. Thus the preferred embodiment of the EP/CSP invention allows graceful and convenient conversion into the information age using a new alphanumeric system to replace the legacy numeric systems. Equally important the new system allows a seamless conversion to a universal worldwide "alpha-numeric" system that each country can use to eventually phase out their existing limited "area code" numbering system. That is, there will be no need for country codes once the EP/CSP system is in full operation. An early inconvenience for those not used to computers and keyboards, is the need for dialing alpha-numeric e-mail addresses rather than just numeric numbers. However the change to the mandatory ten numbers dialing system is conditioning most people for change already. Also, most of the new digital telephones allow individuals to store up to several hundred telephone numbers for automatic dialing so such an inconvenience will be more than offset by not having to remember separate facsimile, telephone, and e-mail information for the same person or company. For example, the EP/CSP system allows a person to have a single e-mail number for the telephone, and by adding "/F" or "/M", or other suitable codes, at the end of the e-mail number, one can call the same person's facsimile or computer modem. Thus only one alphanumeric string is required on the business card or letterhead. Also, if you are in a company and have an extension you just add "/xxx" for the extension number. With this example you can quickly see that the new system will provide unlimited telephone capacity and eliminate the need for having separate 1-800, facsimile, e-mail, telephone, and pager directories which must be constantly updated. In fact the new system will automatically search for all five numbers each time you call and if the individual does not have the one you called it will tell you the individual does not have that service (e.g. 1-800 service). All the caller has to do is add "/xxx" for the desired service. For example, if one computer is calling another computer then the computer software will automatically add "/M" at the end of the e-mail number and the CSP will connect the caller to the computer line rather than the voice or facsimile line. The new system is also suited for the conversion to line sharing systems such as the one recently announced by Sprint. This is because the EP/CSP subsystem elements automatically listen for their coded address before allowing a connection to be made or a function delivered. This is part of the Internet protocol features that are incorporated into the EP/CSP system design. That is, the EP telephone will work with both dedicated lines systems and network systems such as WWW, the company Intranet or Extranet. Thus the EP/CSP system design truly anticipates and combines the various types of communication styles used today and foreseen in the $21^{st}$ century. At the same time, it provides an alpha-numeric numbering system that would allow the individual or community to grow with out worrying about the CSP running out of telephone numbers just because more lines (actually, more connections) were needed. At the time of this invention there is estimated to be several hundred million unique e-mail addresses worldwide, and the number is growing at a rate of several 100,000 per day. To change our legacy telephone systems over to a method that takes advantage of the unique e-mail alphanumeric strings that are being created at very low cost would allow all types of communication systems to grow in an unlimited and less costly manner in the future. In other words, it just makes good sense and provides many opportunities for the telephone companies to get into the Internet service business and for telephone companies to offer Internet services. Services such as direct connect and Internet connect at two different rates (e.g., in FIG. 1 have direct connect over line 25 at one rate and Internet connect over line 26 at a lower rate).

BRIEF DESCRIPTION OF THE DRAWINGS

FIG. 4 is used to describe how data messages can be sent or received over the E-phone.

DETAILED DESCRIPTION OF THE INVENTION

Figure 1:
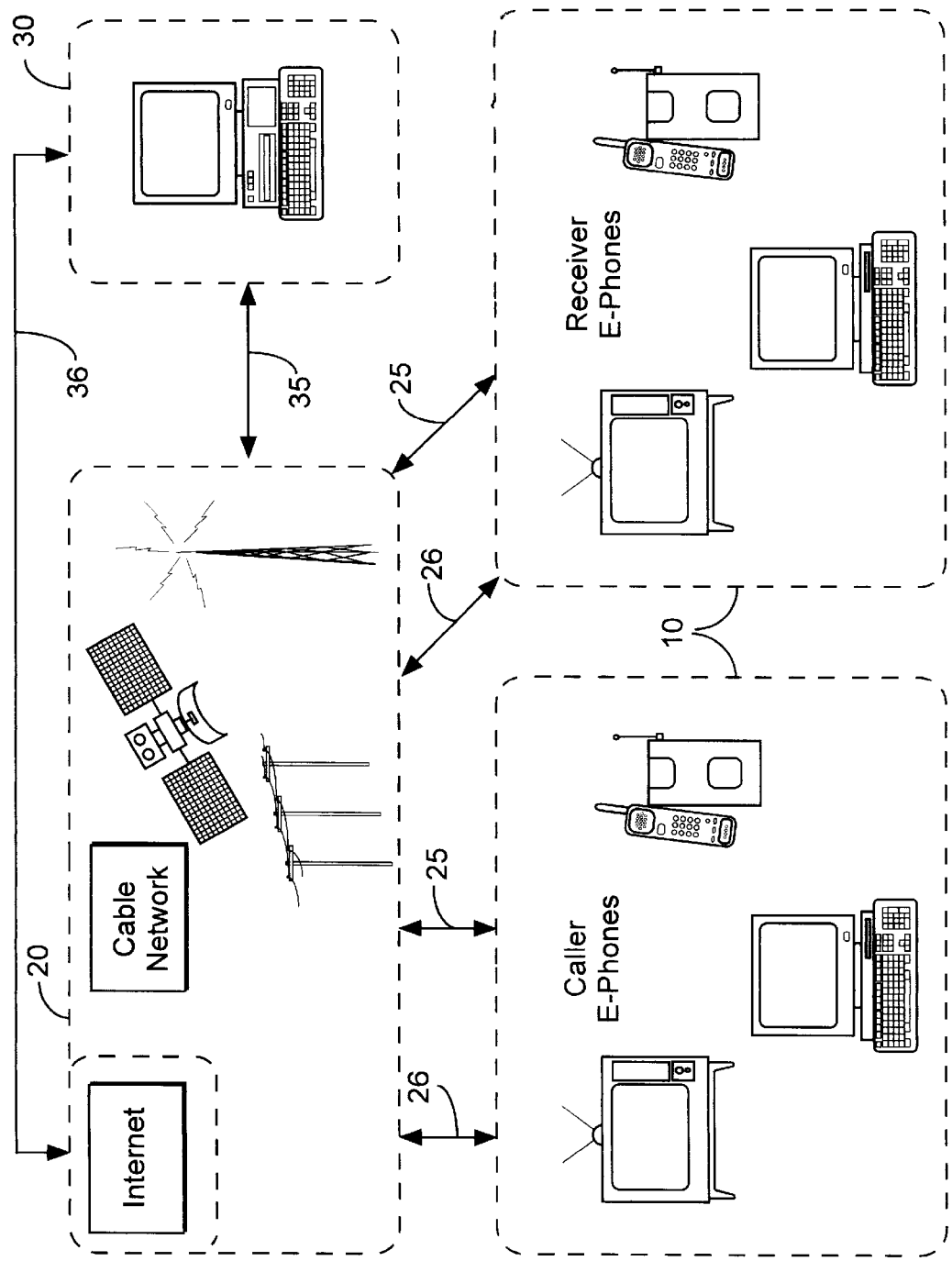
FIG. 1 shows a diagram depicting the major E-phone communication subsystem elements. Several types of E-phone units are shown by way of example representing the most common telephone system I/O units in use today. Also the four most common direct means of connecting telephones and data machines today are shown along with an Internet link which uses the same infrastructure lines as the direct connect lines but with a special protocol which allows universal packet communication between Internet Service Providers. An EP/CSP service provider central processor unit which could likely be one of the telephone companies such as AT&T or World Com or even an ISP such as AOL.

Referring to FIG. 1, the basic EP and CSP subsystem elements are depicted and are comprised of the EP caller and receiver units 10, the communication links 20, and the communication Client Service Provider Unit (CSPU) 30. The caller EP units 10 are the same as the receiver EP units 10 except in the case of one way pager EP unit. Although, any of the caller EP units 10, can be used with any of the receiver EP units 10. By way of example a caller may be using a WEB TV or computer telephone EP unit 10 and contact someone that is using a regular telephone EP unit 10. Since this is understood, hereafter, we will not make a distinction between the caller and receiver EP units 10 unless it is required to make a distinction for the sake of clarity as is the case with the one way pager EP units. These E-phone Units (EPU) 10 are connected via 25 by one of several common direct connect communication links 20 ranging from the old copper wires to fiber optic cables and satellite links and of course this includes the Internet Backbones shown separately as connected by 26. The wireless cellular network links are shown in 20 since they are the communication links of choice for non-urban systems and pager networks. One connection and communication session between two EPU 10 subsystem elements may use any combination or all four methods shown in 20, depending on the locations of the EPU's being connected and the service requested. The communication link 20 is connected via 35 (direct connect) and 36 (Internet connect) to at least one CSP 30 which is used to condition the communication signals and determine the amount of money to charge the EPU 10 owner responsible for the call and service provided.

Figure 2:
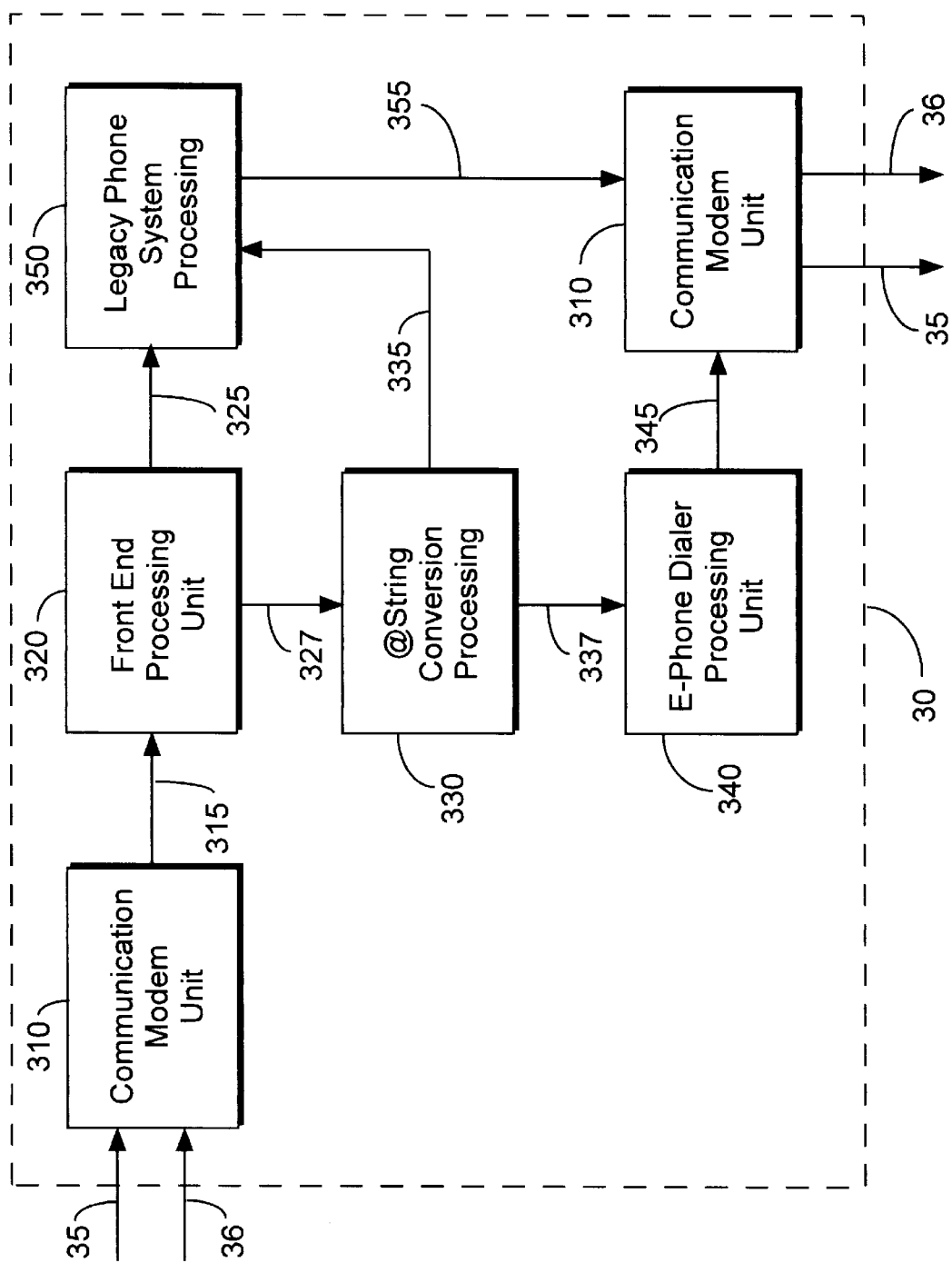
FIG. 2 shows the CSP processing unit and the signal flow logic in more detail. Only those portions required to turn an existing legacy telephone service provider into an EP/CSP system are shown, the rest of the elements are grouped and put into the legacy telephone system Processing unit.

Referring now to FIG. 2, the CSPU 30 is further described to show how the signal from the EPU unit 10 received from one of the links 30 via 35 or 36 is processed using the new alpha-numeric protocols and methods. The CSPU 30 has a communication interface and modem unit (CMU) 310 that is the same as used in current telephone processing centers. This CMU 310 is connected via 315 to a special front end processing unit 320 that looks for the "@" symbol (or other selected special symbol if the preferred embodiment is not used) in the front end connection signal 35. Please note that the "@" symbol is used herein merely by way of example, and another symbol or group of symbols could be used in implementing the present invention. Note, the physical connection portion of the CMU 310 is not discussed since there are no changes required in this part of the legacy systems signal processing to implement the EP and CSP system described. If no "@" Symbol is detected in the front-end protocol connection signal 35 by unit 320 then the signal is sent via 325 directly to the existing legacy telephone Service Provider Unit for processing (LSPU) 350 for normal dialing and connection. That is, if a legacy protocol signal 35 is detected by 30, the CSPU 30 operates just like in a LSPU of today. When an "@" symbol is detected in the front-end protocol the signal is sent via line 327 from unit 320 to the @String Conversion Processing Unit (@CPU) 330 for processing. The @CPU 330 primarily checks to find the legacy numbers associated with the @String received via line 327. In addition the @CPU 330 determines which type of connection the EPU 10 caller requested. That is, the @CPU 330 determines if the caller EPU 10 requested to be connected to a computer modem, facsimile, pager, e-mail, extension, etc. In the preferred embodiment the "/xxx" symbols are used to make such choices since they are natural extensions of the Internet back slash "/" methods becoming so familiar to everyone. The suggested method is an advanced form of legacy front-end protocols like "*72" used today to have special meaning such as, "call forwarding" to the LSPU 350 units. If the telephone companies want to use different standards, this does not change the role of the @CPU 330, only the symbols which need to be detected. In other words this system lays right on top and at the front-end and back-end of the existing LSPU 350 systems. When a match between a legacy number is made at the @String the @CPU 330 will normally send the legacy number directly to the LSPU 350 via line 335. In cases where there is no match but the e-mail address has been verified along with the type of connection requested (e.g. modem, facsimile, etc), the @CPU 330 sends the signal via line 337 to the E-telephone Dialer Processing Unit (EDPU) 340 to condition the signal for connection. The EDPU 340 is very similar, if not the same hardware, as most LSPU 350 systems since its role is to send both protocol and communication signals via line 345 to the CMU 310 unit for connection. The only difference is that the EDPU 340 knows that the receiver EPU 10 is using the new CSP alphanumeric system and thus there are many more signaling options available. The most notable would be communication over the Internet similar to the Internet telephones using a much lower price since the messages will be packet switched all the way rather than a dedicated line for the "last mile" on each end. Note that for many years the telephone companies may assign "Virtual" numbers to the various alpha-numeric strings in order to use the existing LSPU 350 systems for connection purposes. However when it comes to packet switching and Internet connections the e-mail strings probably will be easier for the time-shared links such as networks. Again these are choices that do not change the nature of the invention and are considered to be options made available with the current overlay design of the preferred embodiment described herein.

Figure 3:
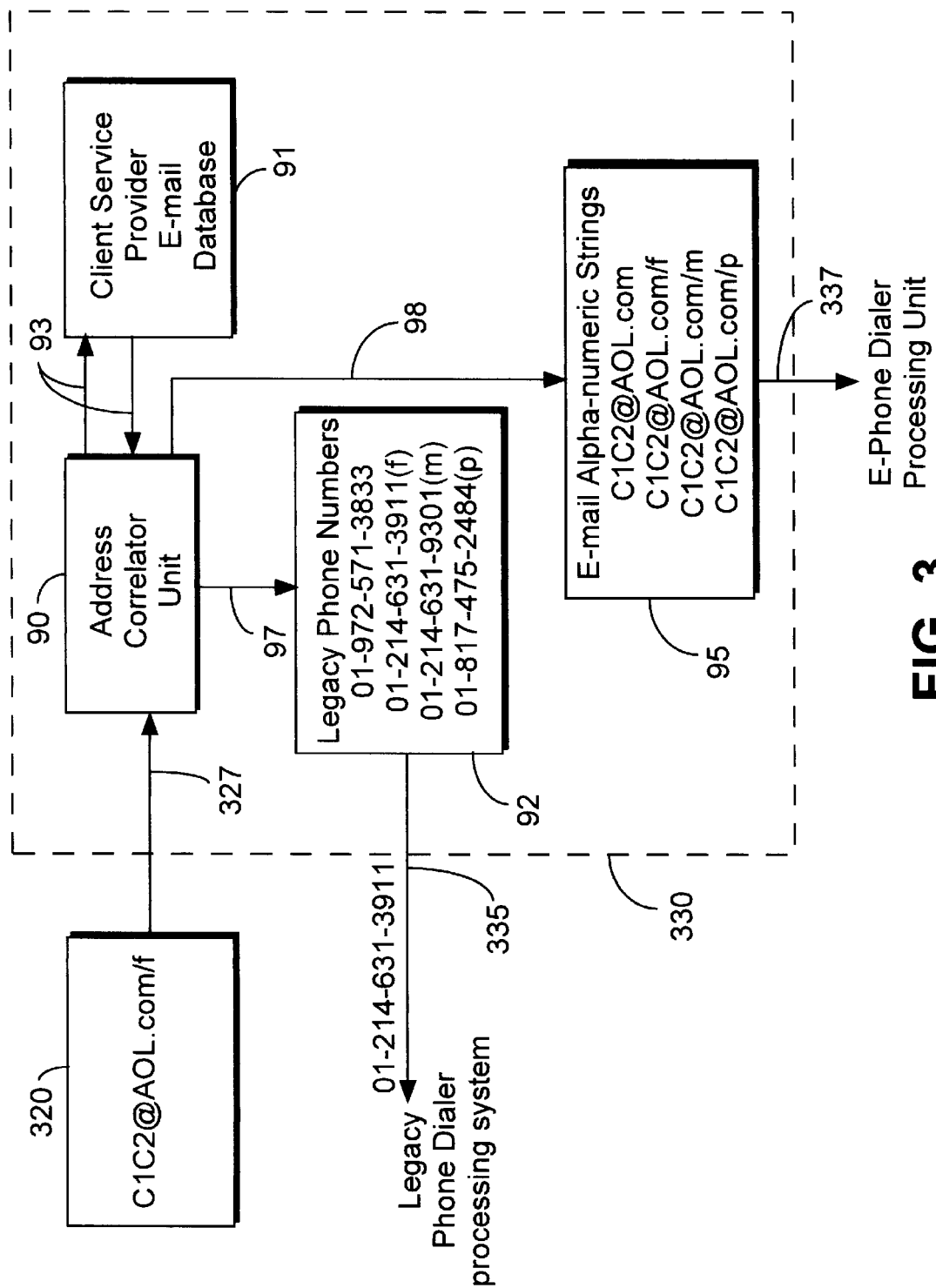
FIG. 3 shows an EP/CSP conversion process example that is at the heart of the CSP processing unit of the present invention.

Referring to FIG. 3, the @CPU 330 and CSP 30 is further described by way of a typical conversion example. In FIG. 3, an "@" detected signal is sent from the front-end processing unit 320 via line 327 to the CSP 30 @CPU unit 330 that has an Address Correlator Unit (ACU) 90 connected via line 93 to a Client Service Provider Database Unit (CSPDU) 91, and via line 97 to a legacy number storage unit (LSU) 92, and via line 98 to an e-mail alpha-numeric string storage unit 95. The example shows that the ACU 90 receives a request to connect to alpha numeric C1C2@AOL.com/f (a facsimile number) via line 327. The ACU 90 then cross-correlates with the CSPDU 91 and sends all the available legacy numbers to storage units 92 via line 97, and the alpha-numeric storage unit 95 receives all the @strings via line 98. Initially, only the "/F" number is sent to the LPSU 350 via line 335 even though it was determined that the individual being called also had a regular telephone number 01-571-3833, a modem number 01-214-631-9301, and a pager number 01-817-475-2484 shown in storage unit 92. In the example given if the LSU 92 was empty then the output would have been C1C2@AOL.com/f sent out on line 337. The reason a complete correlation is done by the ACU 90 is for other options that might be exercised later in case the receiver EPU 10 fails to answer the connect signal in a predetermined length of time. The most obvious other options are predetermined requests to page the owner of the receiver EPU 10 or send a voice message to the receiver EPU 10 voice box. Such services are in common use today so the current invention makes it easy to fulfill such services and even add some new services. Services, like paging on demand by the caller EPU 10. This could be done by using a special double back slash such as "//p" for a request by the caller EPU 10 to page the individual if they have a receiver EPU 10 page number, and there is no answer after a predetermined period of time. Also the request may be for a low cost Internet connection using lines 26 and 36 if a direct connection can not be made on lines 25 and 35. Today no such demand options are available to the caller EPU 10, only to the owner of the receiver EPU 10 are these options available plus they are not demand options but on or off options. These are just some of the advantage of combining all of the various legacy systems into a worldwide network. Note that the ACU 90 and CSPDU 91 units are really distributed units spread all over the world and connected by router networks used to keep the master data bases current just like the Internet systems use. However, with the technology today this is not such a difficult task and must be done anyway for the WWW traffic. The point is, this part of the system will most likely be distributed for several years to come even though it is depicted in this system as a simple data base CSPDU 91 and correlator ACU 90 unit.

Figure 4:
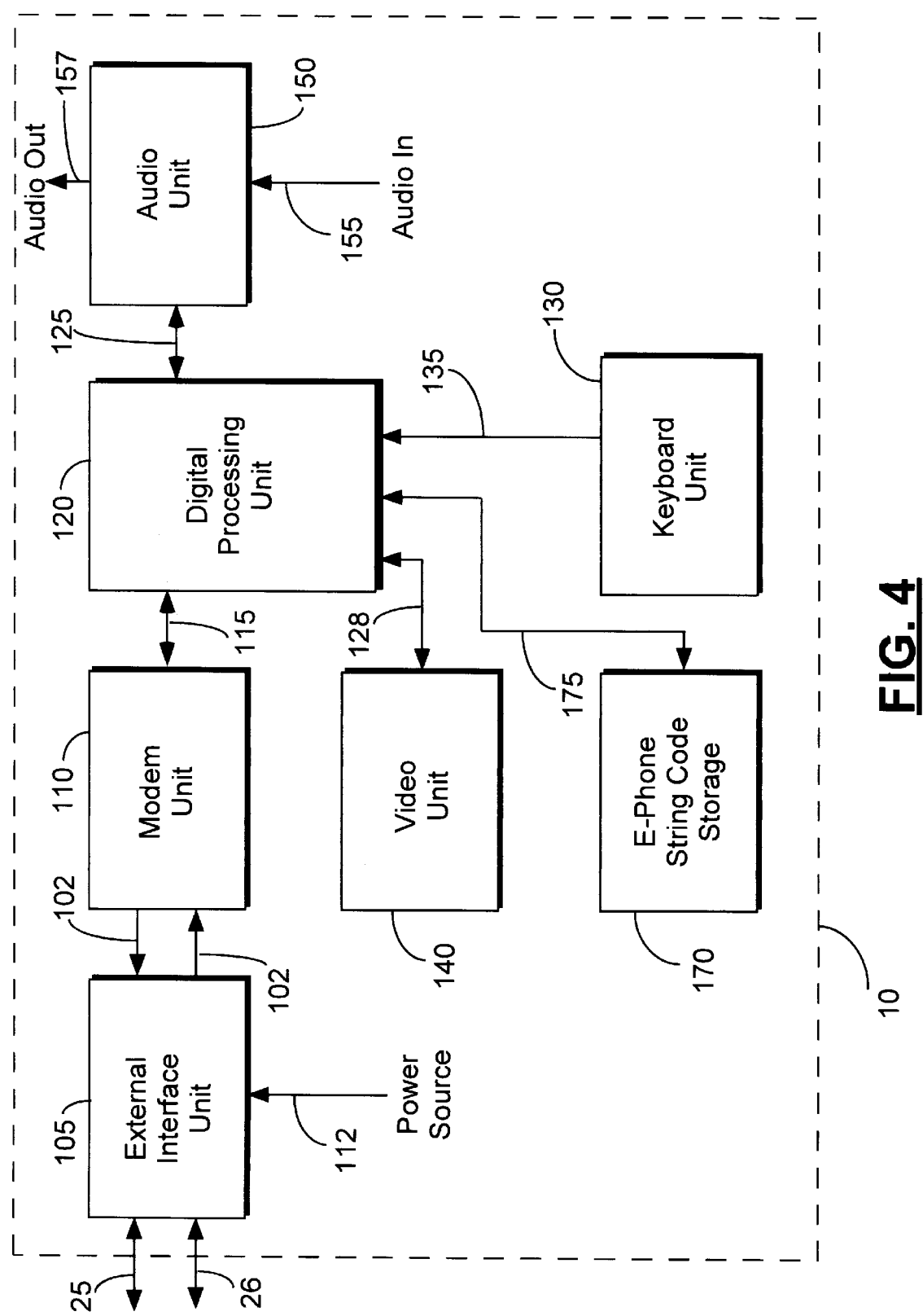
FIG. 4 shows the EPU basic function elements and logic flow diagram showing a distinction between voice and data messages. Also.

Finally, referring to FIG. 4, the basic function elements of the EPU 10 are shown along with a signal logic flow diagram. The EPU 10 has an External Interface Unit (EIU) 105 connected to the communication link 20 via line(s) 25 for direct connect and 26 for Internet connect. The EIU 105 is shown connected to the Modem Unit (MU) 110 via line(s) 102 which may be the same or might be different just like the lines 25 or 26 may be the same or different. A power source 112 is connected to all the units but for simplicity is only shown connected to the EIU 105. The EIU 105 and MU 110 are the basic communication elements and depending on if the EPU 10 is a computer, cellular telephone, WEB TV system or regular telephone each one has these two communication elements does not need to change. Also, most of the new telephones have a Digital Processing Unit (DPU) 120 connected to a Video Unit (VU) 140 and an Audio Unit (AU) 150 and all telephones have some sort of Keyboard Unit (KU) 130 (except possibly rotary dialers). All telephones also have unique code strings assigned either at the telephone end or at the CSP line connection 25 or 26 end. This unique string is represented by the E-phone string code storage unit (EPCSU) 170 that is shown connected to the DPU 120 via line 175. To stay simple such things as ring circuits, off hook and busy signal detectors are included in the appropriate elements shown and are well known to those skilled in the art.

All of the basic function elements of FIG. 4 are available with the Nokia 9000 units and with any 1999 PC using the appropriate communication software package such as Communicator PRO. As in the case of the legacy service provider systems, LSPU 350, the legacy system EPU's 10 have a Protocol overlay on the Front end (the caller function end) and the Back end (the receiver function end). On the Front end the user only has to learn how to type in alphanumeric strings, such as an e-mail address or a domain name, in addition to legacy communication numbers using the KU 130. This caller string is then sent via 135 to the DPU 120 and appended after the EP unique code denoting the caller ID from the EPCSU 170 from those EPU 10 units that have that function performed at the EPU 10 location. Both of these signals are then sent directly from the DPU 120 via lines 115,102, and 25 or 26 to the CSP 30 via line 35 or 36. When standard legacy telephones are used such as are in most of the homes today the caller ID is appended at the CSP location. However, for purposes of clarity this description assumes it is performed at the EPU 10.

For most people in this country this process is already becoming second nature because of the requirement to use computers in almost every aspect of every day life. On the Back end (the receiver function) the user can receive much more information with out having to have many different telephone or communication numbers and interconnect systems. That is, one can get e-mail, voice messages, facsimile messages all from one service provider and all from one message box. Now one has to sign up for multiple services to achieve this and still keep track of legacy telephone systems. In short all current EPU 10 subsystems could become more useful and simpler to use if a unified alpha-numeric string system was adopted and implemented by one or more CSP companies. In fact the current invention would allow ISP companies such as AOL to get into the Communication business and allow the communication Companies, such as World Com or AT&T, to offer Internet services. Since Deregulation takes effect Mar. 31 of 1999 this invention would open the door for many companies. Also it is worth noting that the current thrust of the telephone and handheld computer manufactures are to deliver EPU's that will allow the user to connect all of the legacy Internet, telephone, and Pager service providers together while keeping the Protocol systems separate. This invention meets the same objectives by overlaying a new alphanumeric string system compatible with all of the existing legacy communication systems. Consequently a much simpler EPU is possible with much more services available to the EPU owner.

Also, FIG. 4 is used to describe how data messages can be sent or received over the E-phone. These are features that are not currently available in the legacy telephone system. The features are available using the new breed of combination hand held computers/telephone units such as the Nokia 9000 communicator series or with modern telephone software designed for PC systems such as Communicator PRO. However all of these other systems assume that the telephone number is different than the e-mail address and handle e-mail communications and telephone communication in two entirely different modes. When making telephone calls the systems use the legacy telephone system protocols and methods and when performing e-mail communication they use legacy e-mail protocols and methods, when contacting someone by pager, the pager numbering system and protocol are used. The E-phone system allows these functions to be combined and greatly simplify the communication process for the individual and will also simplify the communication systems of the future compared to the multi-legacy systems of today.

Changes may be made in the steps or sequence of steps of the construction or operation or mode methods described herein without departing from the spirit and the scope of the invention as defined in the following claims.

What is claimed is:

1. A client service provider unit for connecting a caller E-phone to a receiver E-phone uniquely identified by at least one of an alphanumeric string and a numeric string, comprising:

a backend telephone system processing unit outputting a connect signal including protocol and communication signals, responsive to receiving a signal containing a numeric string, to connect the caller E-phone to the receiver E-phone identified by the numeric string;

an E-phone dialer processing unit outputting a connect signal including protocol and communication signals, responsive to receiving a signal containing an alphanumeric string, to connect the caller E-phone to the receiver E-phone identified by the alphanumeric string;

a front-end processing unit receiving a front-end connection signal containing one of an alphanumeric string and a numeric string uniquely identifying the receiver E-phone from the caller E-phone, the front-end processing unit determining which of the alphanumeric string and the numeric string is contained in the front-end connection signal, and outputting a first signal including the alphanumeric string where the front-end connection signal includes the alphanumeric string, and a second signal including the numeric string to the backend telephone system processing unit where the front end connection signal includes the numeric string whereby the backend telephone system processing unit connects the caller E-phone to the receiver E-phone identified by the numeric string;

a string conversion processing unit receiving the first signal including the alphanumeric string from the front end processing unit, the string conversion processing unit comprising a client service provider E-mail database including a plurality of alphanumeric strings identifying a plurality of receiver E-phones and a plurality of numeric strings identifying a plurality of receiver E-phones where each of the numeric strings in the client service provider E-mail database is correlated with at least one of the alphanumeric strings in the client service provider E-mail database, the string conversion processing unit determining whether at least one of the plurality of numeric strings in the client service provider E-mail database is correlated with the alphanumeric string included in the first signal, and outputting a signal, including the numeric string correlated with the alphanumeric string in the first signal, to the backend telephone system processing unit where one of the plurality of numeric strings in the client service provider E-mail database is correlated with the alphanumeric string included in the first signal whereby the backend telephone system processing unit connects the caller E-phone to the receiver E-phone identified by the numeric string, and outputting a signal, including the alphanumeric string in the first signal, to the E-phone dialer processing unit where one of the plurality of numeric strings in the client service provider E-mail database is not correlated with the alphanumeric string included in the first signal whereby the E-phone dialer processing unit connects the caller E-phone to the receiver E-phone identified by the alphanumeric string.

2. The client service provider unit of claim 1, wherein the alphanumeric string contained in the front end connection signal is an e-mail address.

3. The client service provider unit of claim 1, wherein the alphanumeric string contained in the front end connection signal is a domain name.

4. The client service provider unit of claim 1, wherein a function code and an alphanumeric string are contained in the front end connection signal, the alphanumeric string being correlated in the client service provider E-mail database with at least two numeric strings in the client service provider E-mail database such that the alphanumeric string and the function code cooperate to uniquely identify one of the numeric strings.

5. The client service provider unit of claim 1, wherein the front end connection signal further includes a demand code to initiate a selected function in response to a predetermined event.

6. The client service provider unit of claim 5, wherein the predetermined event is the receiver E-phone failing to answer the connect signal.

7. The client service provider unit of claim 6, wherein the selected function is connecting, via at least one of the backend telephone system processing unit and the E-phone dialer processing unit, the caller E-phone to a selected receiver E-phone, the selected receiver E-phone being different from the receiver E-phone identified by the alphanumeric string in the front end connection signal.

8. The client service provider unit of claim 6, wherein the selected function is connecting, via at least one of the backend telephone system processing unit and the E-phone dialer processing unit, the caller E-phone to a voice mail system associated with the receiver E-phone identified by the alphanumeric string in the front end connection signal.

9. A client service provider unit for connecting a caller E-phone to a receiver E-phone uniquely identified by at least one of an alphanumeric string and a telephone number, comprising:

a backend telephone system processing unit outputting protocol and communication signals, responsive to receiving a signal containing a telephone number, to connect the caller E-phone to the receiver E-phone identified by the telephone number;

an E-phone dialer processing unit outputting protocol and communication signals, responsive to receiving a signal containing an alphanumeric string, to connect the caller E-phone to the receiver E-phone identified by the alphanumeric string;

a front-end processing unit receiving a front-end connection signal containing one of an alphanumeric string and a telephone number uniquely identifying the receiver E-phone from the caller E-phone, the front-end processing unit determining which of the alphanumeric string and the telephone number is contained in the front-end connection signal, and outputting a first signal including the alphanumeric string where the front-end connection signal includes the alphanumeric string, and a second signal including the telephone number to the backend telephone system processing unit where the front end connection signal includes the telephone number whereby the backend telephone system processing unit connects the caller E-phone to the receiver E-phone identified by the telephone number;

a string conversion processing unit receiving the first signal including the alphanumeric string from the front end processing unit, the string conversion processing unit comprising a client service provider E-mail database including a plurality of alphanumeric strings and a plurality of telephone numbers where each of the telephone numbers in the client service provider E-mail database is correlated with at least one of the alphanumeric strings in the client service provider E-mail database, the string conversion processing unit determining whether at least one of the plurality of telephone numbers in the client service provider E-mail database is correlated with the alphanumeric string included in the first signal, and outputting a signal, including the telephone number correlated with the alphanumeric string in the first signal, to the backend telephone system processing unit where one of the plurality of telephone numbers in the client service provider E-mail database is correlated with the alphanumeric string included in the first signal whereby the backend telephone system processing unit connects the caller E-phone to the receiver E-phone identified by the telephone number, and outputting a signal, including the alphanumeric string in the first signal, to the E-phone dialer processing unit where one of the plurality of telephone numbers in the client service provider E-mail database is not correlated with the alphanumeric string included in the first signal whereby the E-phone dialer processing unit connects the caller E-phone to the receiver E-phone identified by the alphanumeric string.

10. The client service provider unit of claim 9, wherein the alphanumeric string contained in the front end connection signal is an e-mail address.

11. The client service provider unit of claim 9, wherein the alphanumeric string contained in the front end connection signal is a domain name.

12. The client service provider unit of claim 9, wherein a function code and an alphanumeric string are contained in the front end connection signal, the alphanumeric string being correlated in the client service provider E-mail database with at least two numeric strings in the client service provider E-mail database such that the alphanumeric string and the function code cooperate to uniquely identify one of the numeric strings.

13. The client service provider unit of claim 9, wherein the front end connection signal further includes a demand code to initiate a selected function in response to a predetermined event.

14. The client service provider unit of claim 13, wherein the predetermined event is the receiver E-phone failing to answer the connect signal.

15. The client service provider unit of claim 14, wherein the selected function is connecting, via at least one of the backend telephone system processing unit and the E-phone dialer processing unit, the caller E-phone to a selected receiver E-phone, the selected receiver E-phone being different from the receiver E-phone identified by the alphanumeric string in the front end connection signal.

16. The client service provider unit of claim 14, wherein the selected function is connecting, via at least one of the backend telephone system processing unit and the E-phone dialer processing unit, the caller E-phone to a voice mail system associated with the receiver E-phone identified by the alphanumeric string in the front end connection signal.

* * * * *